United States Patent [19]

Komori et al.

[11] Patent Number: 5,487,148
[45] Date of Patent: Jan. 23, 1996

[54] METHOD AND APPARATUS FOR DETECTING FAULTS IN A COMPUTER NETWORK

[75] Inventors: Naoki Komori, Tokyo; Akio Morita, Saitama; Katsuaki Suzuki, Asaka, all of Japan

[73] Assignee: Honda Giken Kogyo Kabushikikaisha, Tokyo, Japan

[21] Appl. No.: 194,075

[22] Filed: Feb. 9, 1994

[30] Foreign Application Priority Data

Feb. 12, 1993 [JP] Japan .................................. 5-024310

[51] Int. Cl.⁶ .................................................. G06F 13/00
[52] U.S. Cl. .............................. 395/182.02; 395/184.01
[58] Field of Search .......................... 395/575, 182.02, 395/184.01, 183.13, 183.15, 183.19; 371/11.2, 16.3

[56] References Cited

U.S. PATENT DOCUMENTS

| | | | |
|---|---|---|---|
| 4,321,666 | 3/1982 | Tasar et al. | 364/200 |
| 4,323,966 | 4/1982 | Whiteside et al. | 364/200 |
| 4,356,546 | 10/1982 | Whiteside et al. | 364/200 |
| 4,412,281 | 10/1983 | Works | 364/200 |
| 4,545,011 | 10/1985 | Lyon et al. | 364/200 |
| 4,769,761 | 9/1988 | Downes et al. | 364/514 |
| 4,872,165 | 10/1989 | Mori et al. | 371/11.2 |
| 5,036,514 | 7/1991 | Downes et al. | 371/51 |
| 5,111,460 | 5/1992 | Botzenhardt et al. | 371/29.1 |
| 5,307,354 | 4/1994 | Cramer et al. | 371/11.2 |

FOREIGN PATENT DOCUMENTS 126956  1/1989  Japan .

OTHER PUBLICATIONS

Gambhir et al., Automated Communication Network Software Fault Isolation, 1991 International Conference on Systems, Man, and Cybernetics, at 719.

Token View Plus and Token View Manager Network Management Software, by Proteon, Inc., product liturature, copyright 1992.

One View Network Manager for PCs and Sun Work Stations. Network Management Software, by Proteon, Inc., product liturature.

*Primary Examiner*—Robert W. Beausoliel, Jr.
*Assistant Examiner*—Alan M. Fisch
*Attorney, Agent, or Firm*—Fish & Richardson

[57] ABSTRACT

The present invention is for a fault detecting system for a computer network comprising a plurality of computer systems which are placed apart and interconnected by a communication network, and a central computer system monitors faults in the network. The central computer system stores fault information which is transmitted from a plurality of computer systems and judges whether the information indicates a fault occurring for a slight fault or for a serious fault based on the length of the duration of the fault, and display means performs the alarm display for a case of a serious fault and does not display for a case of a slight fault. As a result, the central computer system effectively detects faults in a computer network in which a plurality of computer systems are interconnected with the central computer system by means of a monitoring system that automatically distinguishes serious faults from slight faults.

4 Claims, 7 Drawing Sheets

| BUSINESS OFFICE | STATE INFORMATION |
|---|---|
| BUSINESS OFFICE A | NO FAULT |
| BUSINESS OFFICE B | FAULT OCCURRING(La) |
| BUSINESS OFFICE C | FAULT OCCURRING(Lb) |
| BUSINESS OFFICE D | NO FAULT |
| ≈ | ≈ |
| BUSINESS OFFICE N | FAULT OCCURRING |

METHOD AND APPARATUS FOR DETECTING FAULTS IN A COMPUTER NETWORK

BACKGROUND OF THE INVENTION

1. Field of the Invention

The present invention relates to a fault detecting system for a computer network in which a plurality of computer systems placed in a wide area or on the premises is interconnected, and more particularly relates to a fault detecting system which effectively detects faults occurring in a high-speed communication network.

2. Related Background Art

A conventional computer network system as shown in a typical example of FIG. 7 has a system confirmation that computer systems which are placed in business offices A, B, C and D which are regionally apart, are interconnected by high-speed digital network lines S1, S2 and S3.

Further, in a case that the computer system of the business office A2 is centralized to monitor faults on the computer network system, the computer system of the business office A comprises a host computer 1, a communication control unit 2, a network control host 3, and a time-division multiplexer 4, and the other offices B, C and D comprise time-division multiplexers 5, 6 and 7, communication control units 8, 9 and. 10, and host computers 11, 12 and 13. The time-division multiplexers 4, 5, 6 and 7 are interconnected by the high-speed digital network lines S1, S2 and S3. Then, the network control host 3 of the business office A is centralized to monitor whether a fault occurs in the network.

Here, in general, a form of the network includes a direct connection such that the business office A and the business office B are directly connected by the high-speed digital network line S1 or the business office A and the business office D are directly connected by the high-speed digital network line S3 and an indirect connection such that the business office A and the business office C are connected by the high-speed digital network lines S1 and S2 though the time-division multiplexer 5.

Next, the functions of the network control host 3 will be described in detail. For example, in a case that a fault occurs on the high-speed digital network line S1 which directly connects the business offices A and B, communication between the units 4 and 5 is disable, and then the network control host 3 receives a fault occurring report from the time-division multiplexer 4 and make a display unit 3D display an alarm indication. Next, a maintenance person (operator), who suspects this indication, inputs a control request command and receives the fault condition information from the time-division multiplexer 4 in order to judge whether the fault is a perpetual fault or an instantaneous fault such that a system power supply instantaneously falls. Then, when the maintenance person confirms the perpetual fault, the maintenance person inputs a request command to reconnect the high-speed digital network line S1 from the network control host 3, so that communication between the business office A and the business office B is restored.

In a case that a fault occurs on the high-speed digital network line S3 which directly connects the business offices A and D, the same restoring process is performed.

On the other hand, in a case that a fault occurs on the high-speed digital network line S2 which is a network form of indirectly connecting the business office C with the business office A trough the business office B, the time-division multiplexer 5 of the business office B detects that communication with the time-division multiplexer 6 of the business office C on the lower part is disable, and sends the fault occurring report to the time-division multiplexer 4 of the business office A. Then, the network control host 3 receives the fault occurring report and makes the display unit 3D display the alarm indication. Next, a maintenance person who suspects this indication inputs a control request command from the network control host 3 and receives the fault condition information from the time-division multiplexer 5 in order to judge whether the fault is a perpetual fault or a instantaneous fault such that a system power supply instantaneously falls. Then, when the maintenance person confirms the perpetual fault, the maintenance person inputs a request command to reconnect the high-speed digital network line S2 from the network control host 3, so that communication between the business office B and the business office C is restored. Consequently, the network form of the business office A and the business office C, which are indirectly connected, is restored.

Note that as the conventional technique, Japanese Patent Laid-Open No. 1-26956 (26956/1989) "Intermittent Fault Detecting Method" has been known.

However, such a conventional fault detecting system for the computer network had the following problems.

The first problem was that whether the fault of the high-speed digital network line was a perpetual fault (serious fault) or an instantaneous fault (slight and self restoring fault) such that a system power supply instantaneously fell, the aforesaid network control host displayed the indication of-the fault occurring on the display unit without considering the seriousness of the fault. In particular, there is a case that such a slight fault occurs few times a day whereas a perpetual fault rarely occurs few times a year. Accordingly, the problem arose that the maintenance person got used to the slight fault on ordinary work, consequently the maintenance person failed to notice the serious faults. Moreover, in order to avoid such mistakes on maintenance, the control request command was inputted to confirm the condition of faults for all cases regardless of the seriousness of the faults, and then the restoring process was performed after the condition of the faults was confirmed; however, these processes were complicated and in particular, in a case of monitoring a computer network having the large number of computer systems, the maintenance person had to take care of enormous fault occurring reports.

The second problem was that in a case of a form of the indirect connection such that the business offices A and C were indirectly connected though the business office B as shown in FIG. 7, for example when the fault occurred on the high-speed digital network line S2 on the lower side, the following problem arose. The problem will be described in detail by comparing the condition of the high-speed digital network line S2 with each processing state of the business offices A, B and C.

Referring to FIG. 8, assuming that a fault occurs on the high-speed digital network line S2 at some point $t_1$, the time-division multiplexers 5 and 6 of the business offices B and C detect the fault (at the point of $t_2$).

Next, the time-division multiplexer 5 of the business office B issues the fault information $E_{BA}$ indicating the occurrence of the fault (at the point of $t_3$), and further the occurrence of the fault is reported to the network control host 3 by transmitting the fault information $E_{BA}$ to the time-division multiplexer 4 of the business office A through the line S1 (at the point of $t_4$). On the other hand, the time-division multiplexer 6 of the business office C also issues the fault information $E_{CB}$ (at the point of $t_3$) and tries to transmit the information $E_{CB}$ to the time-division multiplexer 5 of the business office B. In other words, the time-division multiplexer 6 tries to indirectly transmit the fault information $E_{CB}$ to the time-division multiplexer 4 of the business office A through the time-division multiplexer 5. However, since there is a fault on the high-speed digital network line S2, actually the fault information $E_{CB}$ is not transmitted. Consequently, the time-division multiplexer 6 continues to issue the fault information $E_{CB}$ until the acknowledgement information is sent back from the time-division multiplexer 5.

Next, once the network control host 3 of the business office A receives the fault information $E_{BA}$ (at the point of $t_5$), this information is reported to the maintenance person by the alarm display on the display unit 3D (at the point of $t_6$).

Next, when reacting to the alarm display, the maintenance person instructs to restore the fault (at the point of $t_7$), the network control host 3 transmits the restoration information $R_{AB}$ to the business office B (at the point of $t_8$). Then, the computer system of the business office B receives this restoration information $R_{AB}$ (at the point of $t_9$), and the high-speed digital network line S2 is treated to restore. When the restoration is completed (at the point of $t_{10}$), a completion report is transmitted to the network control host 3 of the business office A from the business office B and is displayed on the display unit 3D. Accordingly, the maintenance person can confirm the restoration of the high-speed digital network line S2.

On the other hand, as described above, the time-division multiplexer 6 of the business office C continues to issue the fault information $E_{CB}$ until the high-speed digital network line S2 is restored (until at the point of $t_3$ or at the point of $t_{10}$), and at the point ($t_{11}$) after the restoration is completed (at the point of $t_{10}$), finally the time-division multiplexer 6 can transmit the fault information $E_{CB}$ to the time-division multiplexer 5 of the business office B. Next, when the time-division multiplexer 5 receives this information $E_{CB}$ (at the point of $t_{12}$), it transmits this information $E_{CB}$ to the time-division multiplexer 4 (at the point of $t_{13}$). Next, when the time-division multiplexer 4 receives the fault information $E_{CB}$ (at the point of $t_{14}$), it instructs the display unit 3D to display that the fault occurs on the high-speed digital network line S2.

It is apparent from the explanation, the fault information $E_{BA}$ and the fault information $E_{CB}$ indicate the same fault on the high-speed digital network line S2. Then, reacting to the fault information $E_{BA}$, the network control host 3 performs restoring, and even though the restoration of the fault is completed at the point ($t_{10}$), the display unit 3D displays again that the fault occurs based on the fault information $E_{CB}$ delayed in transmitting. However, the maintenance person could not notice the identity of the alarm display based on the fault information $E_{CB}$ and the fault information $E_{BA}$, so that some irrationality was caused such that the maintenance person considered that the alarm display based on the fault information $E_{CB}$ was the occurrence of a new fault and then instructed again to restore the high-speed digital network line S2.

SUMMARY OF THE INVENTION

The present invention is accomplished to solve the problems of the conventional fault detecting system for a computer network. It is an object of the present invention to provide a fault detecting system for a computer network which can effectively detect faults in the network and rationalize monitoring.

In order to achieve the above object, the present invention is for a fault detecting system for a computer network comprising a plurality of computer systems which are placed apart and interconnected by a communication network, and a central computer system monitors faults in the network, and the central computer system comprises control information extracting means for receiving control information including fault information transmitted from said plurality of computer systems and fault restoration information, distinguishing between the fault information and the fault restoration information, analyzing the information by item of a transmitting source, storing a first information indicating no fault for the fault information and a second information indicating fault occurring for the fault restoration information as a data file, and state information processing means for searching the data file stored in said control information extracting means, at the same time judging the seriousness of the fault in accordance with the length of duration of said second information generating, adding information indicating the seriousness of the fault into the second information, instructing display means to perform an alarm display for the item including the second information indicating the serious fault.

According to the present invention comprising such configuration, the state information processing means judges whether the second information indicating a fault occurring is for a slight fault or a serious fault based on the length of the duration of the fault, and the display means performs the alarm display for a case of a serious fault and does not display for a case of a slight fault, therefore the information which is essentially required for maintenance and monitoring can be obtained.

In other words, a fault indicated by the second information is judged whether it is a slight fault or a serious fault based on the length of duration of the fault occurring, and for a serious fault, the display means is instructed to perform an alarm display and for a slight fault, the display means is instructed not to perform any indication, therefore the display means perform the alarm display only for the information of fault occurring which is essentially required for a maintenance person. Consequently, the maintenance person is not forced to treat an instantaneous fault which does not need a special restoring process, and can be concentrated on monitoring a serious fault which is supposed to be treated. Further, the maintenance person is not forced by the complicated and hard job to distinguish the serious information from the enormous information of fault occurring displayed on the display unit, so that an oversight of fault is prevented and monitoring with high reliability can be achieved. Further, in a case that a fault occurs between a central computer system and other computer system which is indirectly connected thereto and conventionally the computer system on the upper side and the computer system on the bottom side transmit the information of fault occurring to the central computer system, the information which is transmitted from the computer system on the lower side is not judged to be the serious fault, so that the unnecessary indication of fault occurring is selectively and rationally prohibited and the control information with high accuracy can be provided.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art form this detailed description.

DETAILED DESCRIPTION OF THE PREFERRED EMBODIMENTS

Figure 1:
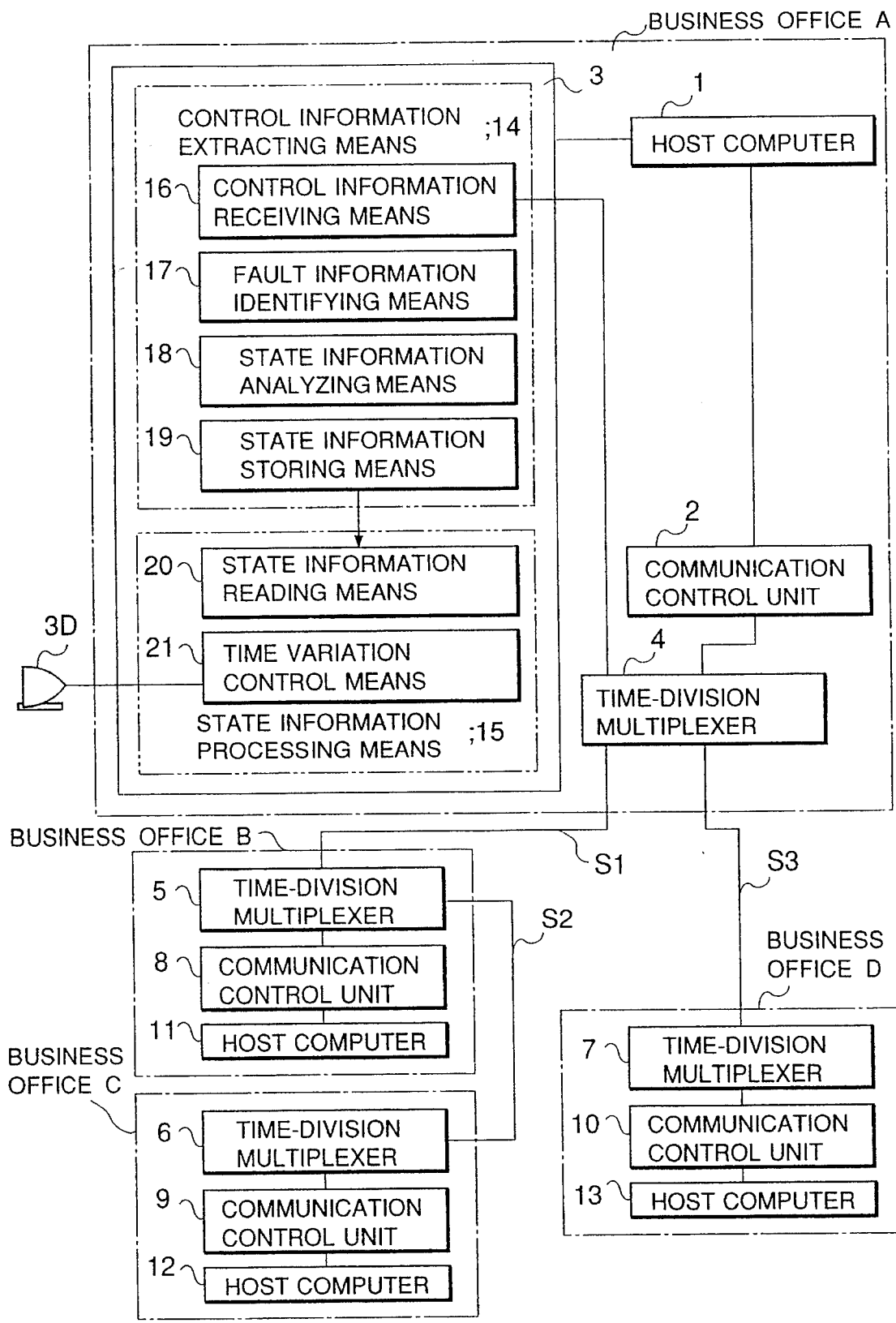
FIG. 1 is a view showing a configuration of a computer network according to one embodiment of the present invention.
Figure 7:
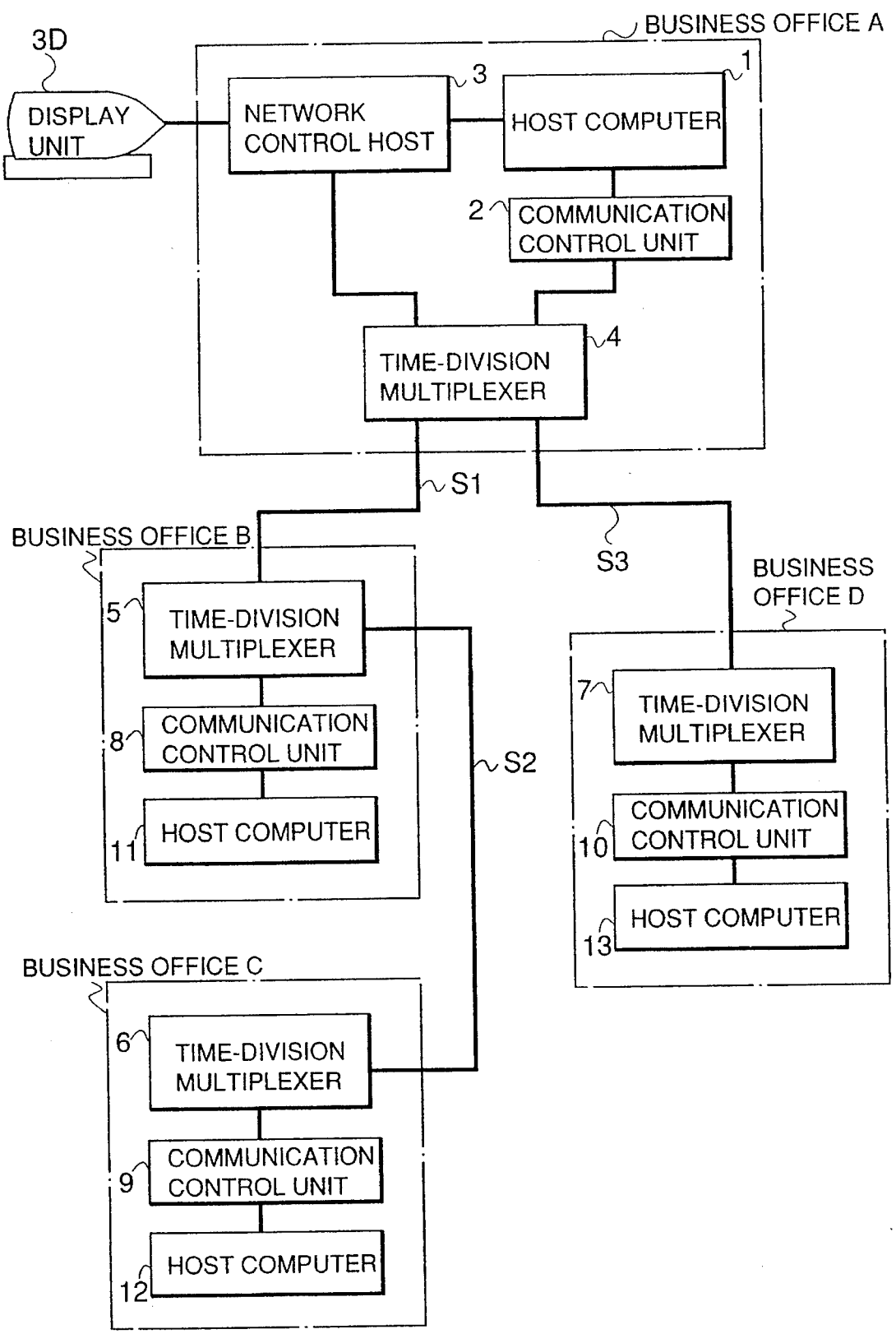
FIG. 7 is a view showing a configuration of a conventional computer network.

One embodiment of the present invention will be explained hereinafter with reference to the drawings. First, the system configuration of the embodiment will be explained with FIG. 1. In order to ease the comparison between the conventional technique and the embodiment of the present invention, in FIG. 1, the parts relating to the components in FIG. 7 are represented by the same reference numerals. In FIG. 1, in a case that the computer system of the business office A is centralized to monitor faults on the computer network system, the computer system of the business office A comprises a host computer 1, a communication control unit 2, a network control host (composed of a computer hardware system and its software) 3, and a time-division multiplexer 4, and the other offices B, C and D comprise time-division multiplexers 5, 6 and 7, communication control units 8, 9 and 10, and host computers 11, 12 and 13. The time-division multiplexers 4, 5, 6 and 7 are interconnected by the high-speed digital network lines S1, S2 and S3. Then, the network control host 3 of the business office A is centralized to monitor whether a fault occurs on the network.

Here, in general, a form of the network includes a direct connection such that the business office A and the business office B are directly connected by the high-speed digital network line S1 or the business office A and the business office D are directly connected by the high-speed digital network line S3 and an indirect connection such that the business office A and the business office C are connected by the high-speed digital network lines S1 and S2 though the time-division multiplexer 5.

A feature of the present invention is the network control host 3 which comprises a control information extracting means 14 and a state information processing means 15.

Further, the control information extracting means 14 comprises a control information receiving means 16, a fault information identifying means 17, a control information analyzing means 18 and a state information storing means 19. The state information control means 15 comprises a state information reading means 20 and a time variation control means 21. Note that these means are actualized, for example by programs which are under the control of an operating system of the host computer 1.

The control information receiving means 16 receives all information transmitted from the time-division multiplexer 4 and transmits the information to the fault information identifying means 17.

The fault information identifying means 17 extracts only the control information relating to the network monitoring from all information transmitted from the control information receiving means 16 and then transmits the extracted information to the control information analyzing means 18. Here, the control information is the fault information indicating the occurrence of fault and the fault restoration information indicating the restoration of fault. Both the fault information and the fault restoration information are the contents of control sent from the time-division multiplexer 5, 6 and 7 of the business offices B, C and D which have been objects to be monitored. Further, distinguishing between the control information and other information and between the fault information and the fault restoration information can be achieved by checking a predetermined data code.

The control information analyzing means 18 analyzes the fault information and the fault restoration information and classifies the information into information for the fault occurring between the business offices or in the terminal equipment, and information for restoration. These analysis results are stored into the state information storing means 19 as state information. Note that in the embodiment as shown in FIG. 4, location such as the business office or the terminal is itemized, and when the fault information is received, the content of the information in the corresponding item is changed to the fault occurring, and when the fault restoration information is received, the content of the information in the corresponding item is changed to no fault (that is, normal state).

Figures 4, 5:
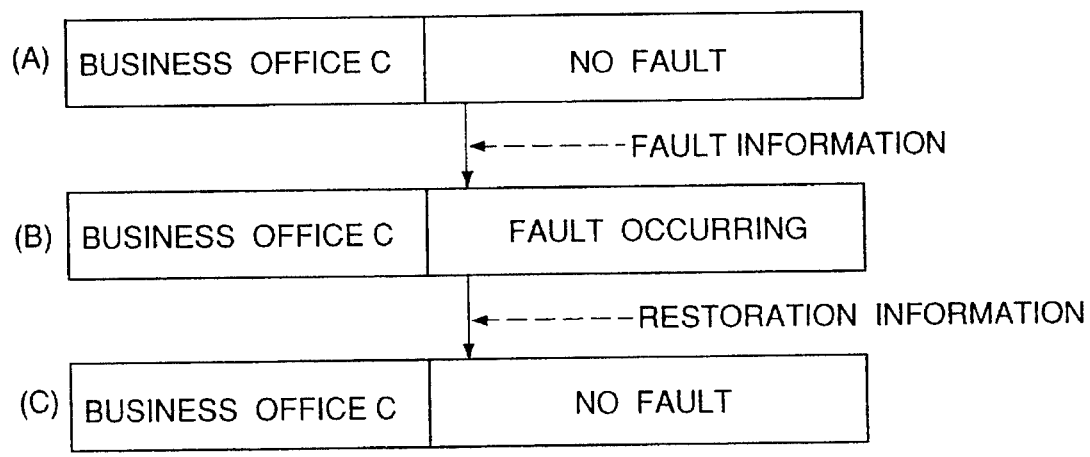
FIG. 4 is a view showing a form of information stored in state information storing means.
FIG. 5 is a view showing effects of time variation control means of one embodiment.

The state information storing means 19 stores the state information from the control information analyzing means 18 as a random file shown in FIG. 4 and changes the content of the stored information corresponding to an instruction to rewrite data from the time variation control means 21.

The state information reading means 20 reads the state information (see FIG. 4) from the state information storing means and transmits the information to the time variation control means 21 at a predetermined cycle $T_W$ (hereinafter, called watching cycle).

The time variation control means 21 examines the content of each item every time the state information in the state information storing means 19 is transmitted through the state information reading means 20 and compares duration of the content being the same with a first criterion of time $T_{RF1}$. Next, when the duration of the content "fault occurring" exceeds the first criterion of time $T_{RF1}$, the time variation control means 21 instructs the state information storing means 19 to change the content of the corresponding information to the content of "fault occurring (La)" which indicates a slight level La of faults. Further, when the duration of the content "fault occurring (La)" exceeds the second criterion of time $T_{RF2}$, the time variation control means 21 instructs the state information storing means 19 to change the content of corresponding information to the content of "fault occurring (Lb)" which indicates a serious level Lb of faults.

In other words, when the control information analyzing means 18 first stores the information for the fault occurring into the state information storing means 19, the content of the corresponding item is simply "fault is occurring" regardless of the seriousness of the fault, and the time variation control means decides the level of seriousness based on the first and second criterion of time $T_{RF1}$ and $T_{RF2}$.

Further, the time variation control means 21 does not instruct the display unit 3D to perform the alarm display for the item corresponding to the content "fault occurring (La)" but instructs the display unit 3D to perform the alarm display only for the item corresponding to the content "fault occurring (Lb)".

Figure 2:
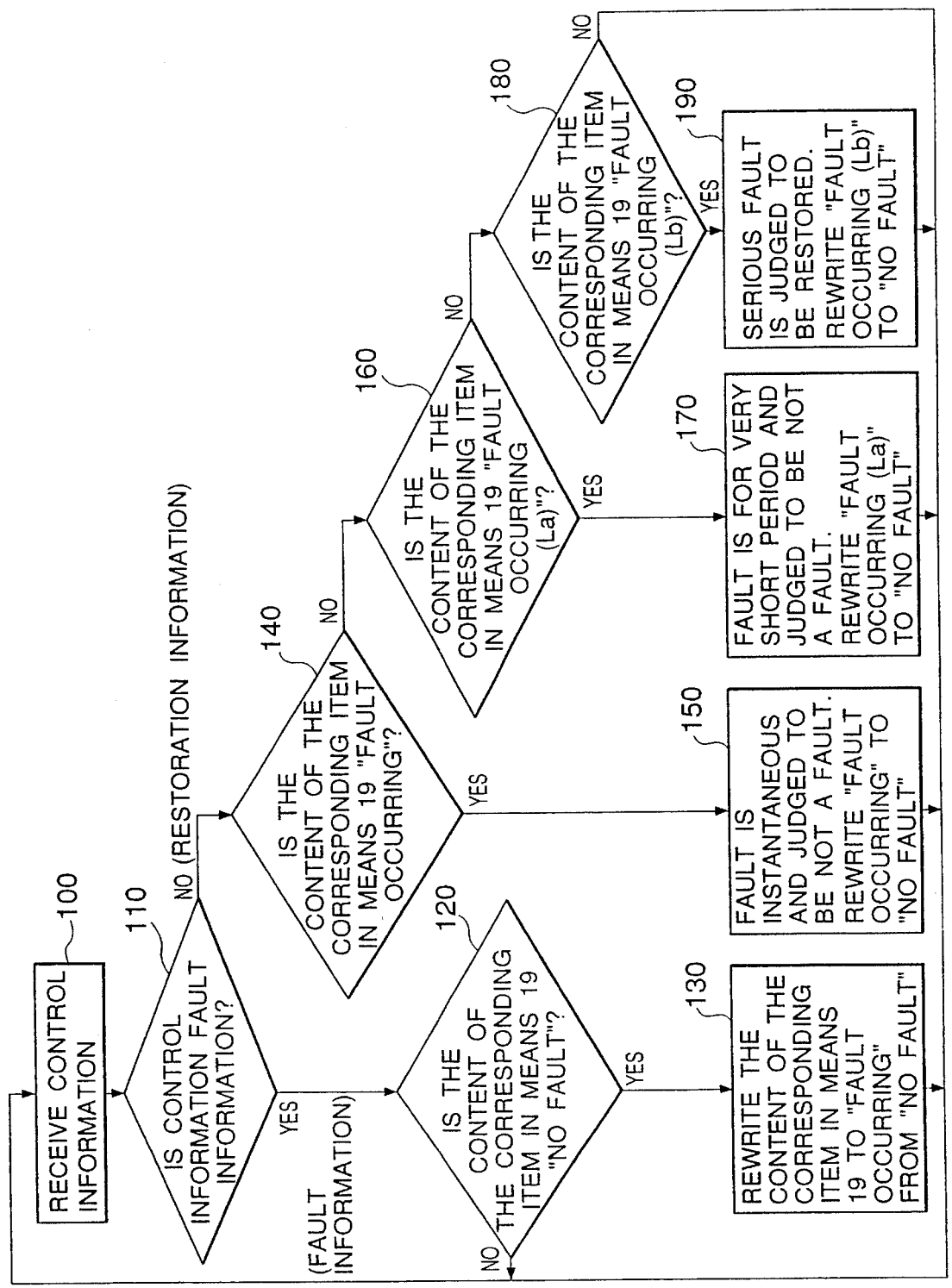
FIG. 2 is a flowchart for explaining effects of control information extracting means of one embodiment.
Figure 3:
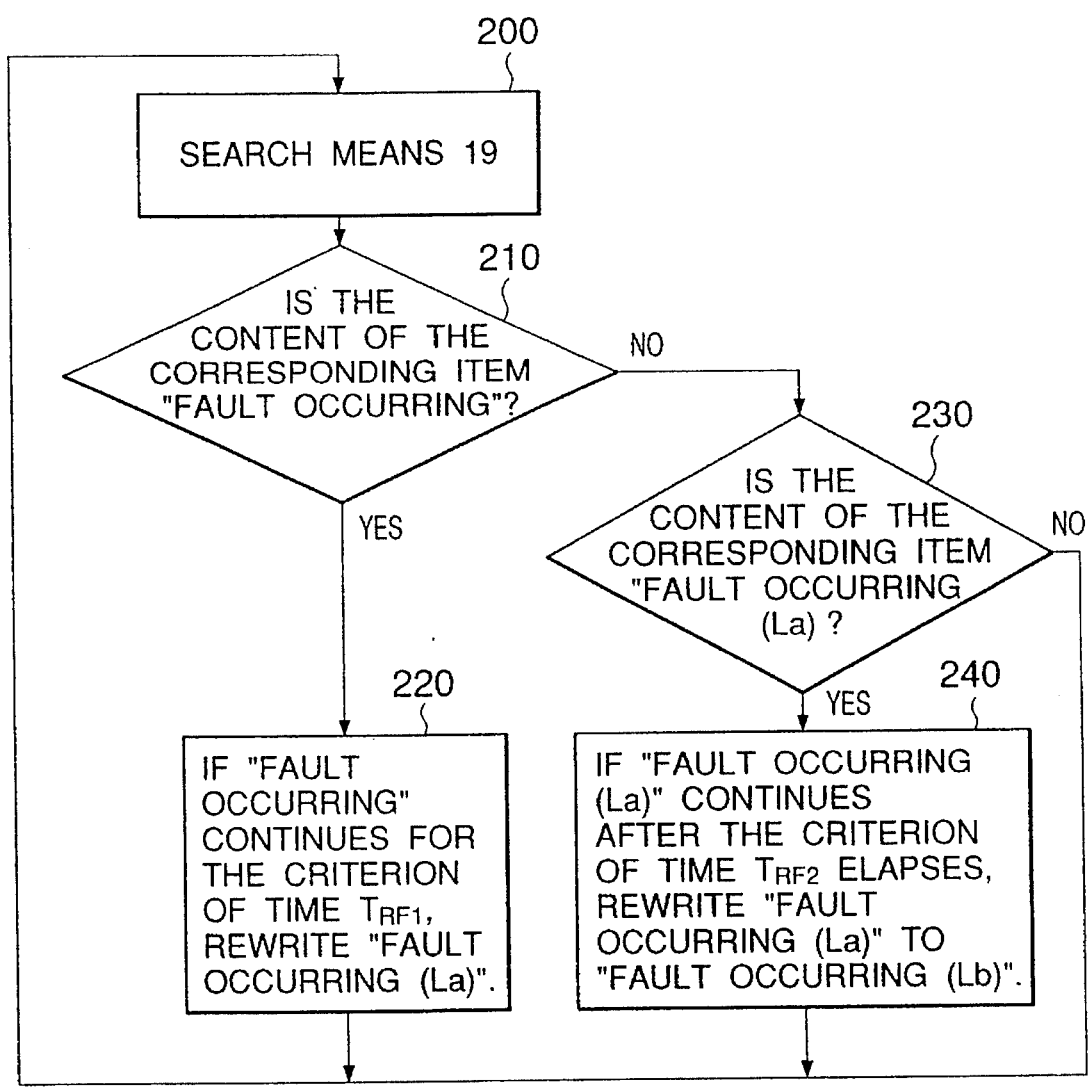
FIG. 3 is a flowchart for explaining effects of state information processing means of one embodiment.

Next, the effects of the embodiment comprising such configuration will be explained based on a flowchart of FIG. 2 and FIG. 3.

Note that the control information extracting means 14 and the state information processing means 15 do not synchronize. The control information extracting means 14 repeats the process of storing the state information into the state information storing means 19 every time the control information (fault information and restoration information) is received whereas the state information processing means 15 repeats the process at the predetermined watching cycle $T_W$.

First, the effects of the control information extracting means 14 will be explained based on FIG. 2. In step 100, once the control information receiving means 16 receives the control information from the time-division multiplexer 4, in step 110, the fault information identifying means 17 distinguishes whether the control information is the information of fault occurring (fault information) or the information of fault restored (restoration information), and if it is the fault information, process proceeds to step 120, and if it is the restoration information, process proceeds to step 140.

In step 120, the control information analyzing means 18 analyzes the specific code of the fault information to identify which items (business offices) the fault relates to. Further, the control information analyzing means 18 searches the corresponding item in the state information storing means 19, and if the content of the corresponding item is "no fault", in step 130, the content is rewritten to "fault occurring". On the other hand, the content of the corresponding item is "fault occurring", process goes back to step 100. For example, when in a case that the fault information which is transmitted from the time-division multiplexer 5 of the business office B indicates the fault on the high-speed digital network line S2 relating to the business office C, if the content is "no fault" as shown in (A) of FIG. 5 before the fault information is received, as shown in (B) of FIG. 5 the content of the item of the business office C is rewritten to "fault occurring". Then, process goes back to step 100 from step 130 and the process proceeds to receive next control information.

In step 140, the control information analyzing means 18 analyzes the specific code of the restoration information to identify which items (business offices) the restoration relates to. Then, the control information analyzing means 18 searches the corresponding item in the state information storing means 19, and if the content of the corresponding item is "fault occurring", in step 150, it decides that practically there is no fault occurring for the corresponding item. Further, after the content is rewritten to "no fault" from "fault occurring", process goes back to step 100. For example, as shown in (B) of FIG. 5, if the state information is "fault occurring" before the restoration information is received, as shown in (C) of FIG. 5 the content is rewritten to "no fault" after the restoration information is received.

In other words, even though the content is "fault occurring", in a case that the restoration information is transmitted for short period, it is decided that the fault is an instantaneous fault such that the power supply instantaneously falls, so that no treatment is needed for the fault, and no indication is displayed on the display unit 3D.

On the other hand, in analysis of step 140, in a case that the content of the corresponding item is not "fault occurring", process proceeds to step 160, and the control information analyzing means 18 confirms whether the content of the corresponding item is "fault occurring (La)". Then, if the content is "fault occurring (La)", process proceeds to step 170. Further, it is decided that the fault is slight and no treatment is needed to restore the fault, and at the same time, the content is rewritten to "no fault" from "fault occurring (La)".

Figure 6:
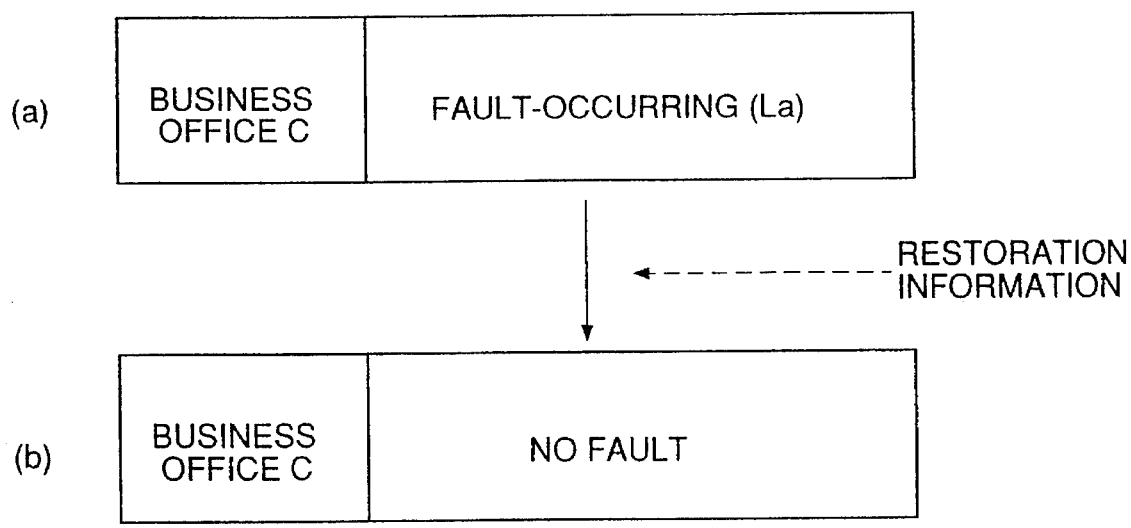
FIG. 6 is a view for further explaining effects of time variation control means of one embodiment.

In other words, even though the content of the corresponding item is "fault occurring (La)" before the restoration information is received as shown in (a) of FIG. 6, the content is rewritten to "no fault" after the restoration information is received as shown in (b) of FIG. 6. This is because the fault is an instantaneous fault such as the fall of system power supply and no treatment is needed to restore. The display unit 3D does not display the indication of the fault restored.

In step 180, the control information analyzing means 18 confirms whether the content of the corresponding item is "fault occurring (Lb)". Then, if the content is "fault occurring(Lb)", process proceeds to step 190, and it is decided that the serious fault indicated by "fault occurring (Lb)" is restored, and the content is rewritten to "no fault" from "fault occurring (Lb)". Further, the display unit is instructed to display the indication of the fault restored. On the other hand, if the content is not "fault occurring (Lb)", process directly proceeds to step 100 from step 180.

Next, the effects of the state information processing means 15 will be explained based on a flowchart of FIG. 3. As described above, the state information processing means 15 repeats the searching-process and the analyzing process for the stored information in the state information storing means 19 (see FIG. 4), synchronizing with the predetermined watching cycle $T_W$.

In step 200, the state information reading means 20 searches all items stored in the state information storing means 19, and the time variation control means 21 performs the process of step 210 and step 210 for each searched item.

First, in step 210, it is decided that whether the content of the corresponding item is "fault occurring", and if it is "fault occurring", process goes to step 220, and for others, process goes to step 230.

Proceeding of process to step 220 means that the state of "fault occurring" is continued. Then, when "fault occurring" is continued during the first criterion of time $T_{RF1}$ elapses from the point of changing the content of the corresponding item from "no fault" to "fault occurring", for example, as shown in FIG. 7, the content of the corresponding item in the state information storing means is rewritten to "fault occurring (La)" from "fault occurring".

On the other hand, in step 230, it is decided that whether the content of the corresponding item is "fault occurring (La)", and if it is "fault occurring (La)", process proceeds to step 240, and for others, process goes back to step 200.

In step 240, in a case that the content of "fault occurring (La)" is continued after the second criterion of time $T_{RF2}$ elapses, it is decided that the fault is perpetual and serious. Further, the content of the corresponding item is rewritten to "fault occurring (Lb)" from "fault occurring (La)", and the occurrence of the serious fault is reported to the maintenance person by displaying it on the display unit 3D.

Thus, in the embodiment, the control information extracting means 14 stores the fault information and the restoration information into the state information storing means as a data file, and the state information processing means 15 analyzes the duration of these information to judge the seriousness of the fault and instructs the display unit 3D to display the serious fault only. Therefore, the maintenance person is not forced to treat the instantaneous fault caused, for example, by the instantaneous fall of the power supply which does not require any treatment to restore and can concentrate on monitoring the serious fault which is supposed to be treated. Moreover, differing from the conventional technique, the maintenance person is not forced the complicated and hard job to distinguish the serious information from the enormous information of fault occurring displayed on the display unit, so that an oversight of fault is prevented and monitoring with high reliability can be achieved.

Figure 8:
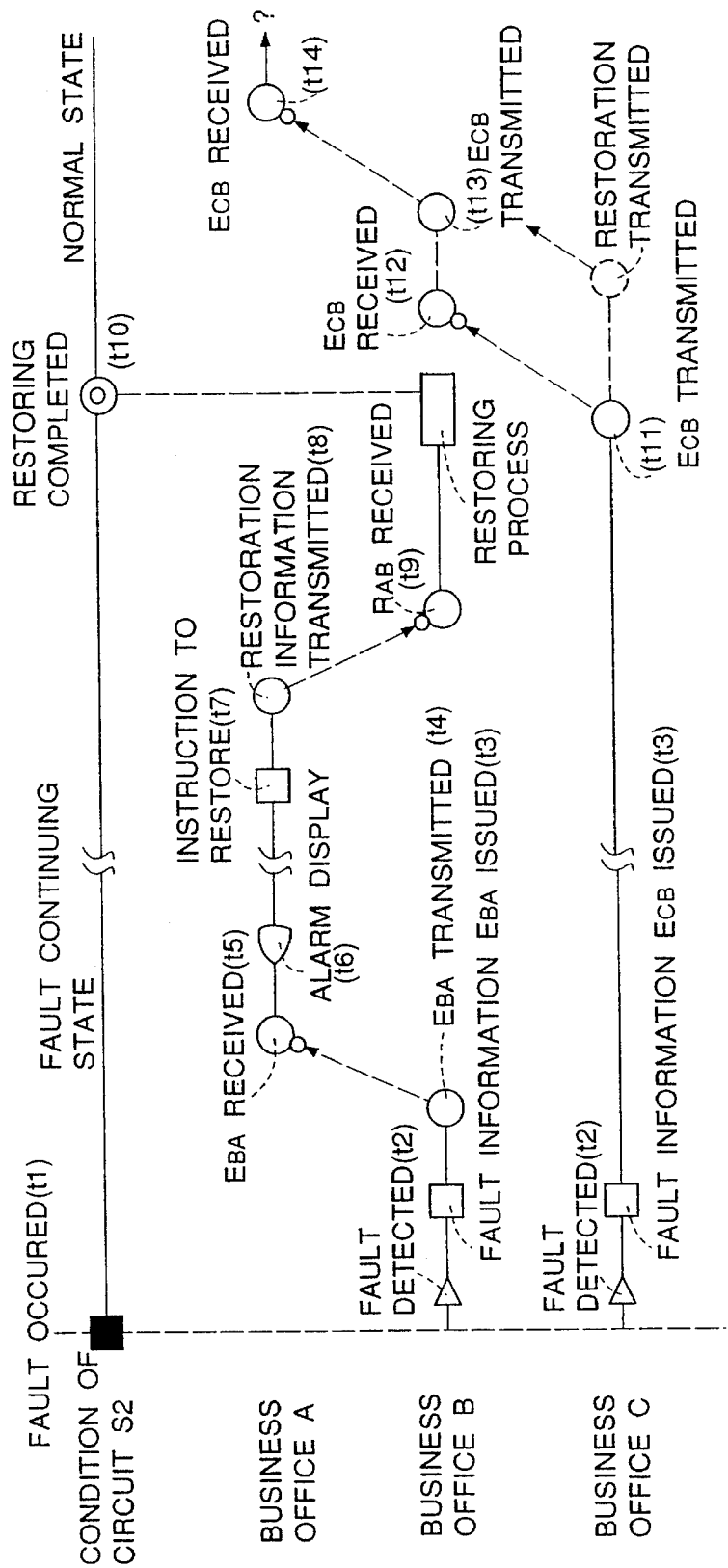
FIG. 8 is a view for explaining the problems of a conventional fault-detecting system.

Moreover, the conventional problems as described above with FIG. 7 and FIG. 8 are improved. In other words, conventionally although practically the restoration of the fault is completed at the point of $t_{10}$ in FIG. 8, the information of fault occurring is transmitted from the time-division multiplexer 6 of the business office C on the bottom side to the network control host 3 (at the point of $t_{11}$ to $t_{14}$), so that it is hard to judge whether the restoration of the fault is completed. In opposition to the conventional technique, in this embodiment, the fault information at the point of $t_{14}$ is stored into the state information storing means 19 in the process of step 100 to 130 shown in FIG. 2, but based on the restoration information transmitted from the time-division multiplexer 6 at the point of $t_{14}$ after short period, the process of step 140 to 170 is performed, so that the alarm display based on the fault information at the point of $t_{13}$ is not displayed on the display unit 3D. Therefore, the unnecessary indication of fault occurring is selectively and rationally prohibited and the control information with high accuracy can be provided for the maintenance person.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

What is claimed is:

1. A method for detecting faults in a computer network comprising a central monitoring system and a plurality of computer systems interconnected by a communication network, each computer system capable of detecting occurrences of (1) fault conditions affecting such computer system, and (2) fault restoration conditions affecting such computer system, and further capable of generating and transmitting over the communication network to the central monitoring system information (1) fault information in response to the occurrence of a detected fault condition and (2) fault restoration information in response to the occurrence of a detected fault restoration condition, the method comprising the steps of:

(1) receiving fault information in the central monitoring system from one of the computer systems by means of the communication network;

(2) storing in the central monitoring system a data record for received fault information, each data record corresponding to the transmitting computer system and indicating occurrence of a first level fault;

(3) receiving fault restoration information in the central monitoring system from one of the computer systems by means of the communication network;

(4) comparing received fault restoration information to a corresponding stored data record in the central monitoring system, and resetting such data record to indicate a no-fault condition;

(5) repeatedly accessing each data record, and changing each data record indicating a first level fault to indicate occurrence of a second level fault if the data record has not been reset to indicate a no-fault condition before lapse of a first pre-set time period;

(6) indicating in the central monitoring system an alarm condition corresponding to each data record set to the second level fault condition, the alarm condition indicating a serious fault condition.

2. A central monitoring system for detecting faults in a computer network comprising a plurality of computer systems interconnected to the central monitoring system by a communication network, each computer system capable of detecting occurrences of (1) fault conditions affecting such computer system, and (2) fault restoration conditions affecting such computer system, and further capable of generating and transmitting over the communication network to the central monitoring system information (1) fault information in response to the occurrence of a detected fault condition and (2) fault restoration information in response to the occurrence of a detected fault restoration condition, the central monitoring system including:

(1) receiving means for receiving fault information from one of the computer systems by means of the communication network;

(2) storing means for storing a data record for received fault information, each data record corresponding to the transmitting computer system and indicating occurrence of a first level fault;

(3) receiving means for receiving fault restoration information from one of the computer systems by means of the communication network;

(4) comparison means for comparing received fault restoration information to a corresponding stored data record, and resetting such data record to indicate a no-fault condition;

(5) search means for repeatedly accessing each data record, and changing each data record indicating a first level fault to indicate occurrence of a second level fault if the data record has not been reset to indicate a no-fault condition before lapse of a first pre-set time period;

(6) indicator means for indicating an alarm condition corresponding to each data record set to the second level fault condition, the alarm condition indicating a serious fault condition.

3. A method for detecting faults in a computer network comprising a central monitoring system and a plurality of computer systems interconnected by a communication network, each computer system capable of detecting occurrences of (1) fault conditions affecting such computer system, and (2) fault restoration conditions affecting such computer system, and further capable of generating and transmitting over the communication network to the central monitoring system information (1) fault information in response to the occurrence of a detected fault condition and (2) fault restoration information in response to the occurrence of a detected fault restoration condition, the method comprising the steps of:

(1) receiving fault information in the central monitoring system from one of the computer systems by means of the communication network;

(2) storing in the central monitoring system a data record for received fault information, each data record corresponding to the transmitting computer system and indicating occurrence of a first level fault;

(3) receiving fault restoration information in the central monitoring system from one of the computer systems by means of the communication network;

(4) comparing received fault restoration information to a corresponding stored data record in the central monitoring system, and resetting such data record to indicate a no-fault condition;

(5) repeatedly accessing each data record, and changing each data record indicating a first level fault to indicate occurrence of a second level fault if the data record has not been reset to indicate a no-fault condition before lapse of a first pre-set time period;

(6) repeatedly accessing each data record, and changing each data record indicating a second level fault to indicate occurrence of a third level fault if the data record has not been reset to indicate a no-fault condition before lapse of a second pre-set time period;

(7) indicating in the central monitoring system an alarm condition corresponding to each data record set to the third level fault condition, the alarm condition indicating a serious fault condition.

4. A central monitoring system for detecting faults in a computer network comprising a plurality of computer systems interconnected to the central monitoring system by a communication network, each computer system capable of detecting occurrences of (1) fault conditions affecting such computer system, and (2) fault restoration conditions affecting such computer system, and further capable of generating and transmitting over the communication network to the central monitoring system information (1) fault information in response to the occurrence of a detected fault condition and (2) fault restoration information in response to the occurrence of a detected fault restoration condition, the central monitoring system including:

(1) receiving means for receiving fault information from one of the computer systems by means of the communication network;

(2) storing means for storing a data record for received fault information, each data record corresponding to the transmitting computer system and indicating occurrence of a first level fault;

(3) receiving means for receiving fault restoration information from one of the computer systems by means of the communication network;

(4) comparison means for comparing received fault restoration information to a corresponding stored data record, and resetting such data record to indicate a no-fault condition;

(5) search means for repeatedly accessing each data record, and changing each data record indicating a first level fault to indicate occurrence of a second level fault if the data record has not been reset to indicate a no-fault condition before lapse of a first pre-set time period;

(6) search means for repeatedly accessing each data record, and changing each data record indicating a second level fault to indicate occurrence of a third level fault if the data record has not been reset to indicate a no-fault condition before lapse of a second pre-set time period;

(7) indicator means for indicating an alarm condition corresponding to each data record set to the third level fault condition, the alarm condition indicating a serious fault condition.

\* \* \* \* \*